US005333111A

United States Patent [19]

Chaiken et al.

[11] Patent Number: 5,333,111

[45] Date of Patent: Jul. 26, 1994

[54] GARMENT CUTTING SYSTEM HAVING COMPUTER ASSISTED PATTERN ALIGNMENT

[75] Inventors: Craig L. Chaiken, Vernon; John A. Fecteau, Manchester, both of Conn.

[73] Assignee: Gerber Garment Technology, Inc., Tolland, Conn.

[21] Appl. No.: 694,871

[22] Filed: May 2, 1991

[51] Int. Cl.[5] .................... G06F 15/46

[52] U.S. Cl. .................... 364/470; 83/76.8; 83/936; 382/8; 364/474.09; 364/474.13

[58] Field of Search .................... 364/470, 468, 474.09, 364/469, 474.13; 83/936-941, 71-76, 76.1, 76.3-76.9, 734; 382/8, 48, 10; 358/101, 107; 356/429, 431; 250/548, 559, 571

[56] References Cited

U.S. PATENT DOCUMENTS

| | | | |
|---|---|---|---|
| 3,391,392 | 7/1968 | Doyle | 364/468 |
| 3,803,960 | 4/1974 | Pearl et al. | 83/56 |
| 3,805,650 | 4/1974 | Pearl | 83/56 |
| 4,071,899 | 1/1978 | Holy | 364/561 |
| 4,120,045 | 10/1978 | Moellgaard et al. | 364/470 |
| 4,149,246 | 4/1979 | Goldman | 364/470 |
| 4,346,366 | 8/1982 | Kajiura et al. | 364/470 |
| 4,354,442 | 10/1982 | Horey | 112/453 |
| 4,429,364 | 1/1984 | Maruyama et al. | 364/400 |
| 4,446,520 | 5/1984 | Shigeta et al. | 364/400 |
| 4,583,181 | 4/1986 | Gerber et al. | 364/470 |
| 4,598,376 | 7/1986 | Burton et al. | 364/470 |
| 4,675,253 | 6/1987 | Bowditch | 428/542.8 |
| 4,677,564 | 6/1987 | Paly et al. | 364/468 |
| 4,725,961 | 2/1988 | Pearl | 36/474.13 |
| 4,853,866 | 8/1989 | Galan et al. | 364/470 |
| 4,905,159 | 2/1990 | Loriot | 364/470 |
| 4,926,344 | 5/1990 | Collins et al. | 364/470 |
| 4,961,149 | 10/1990 | Schneider et al. | 364/474.09 |
| 5,172,326 | 12/1992 | Campbell, Jr. et al. | 364/474.09 X |

FOREIGN PATENT DOCUMENTS

| | | |
|---|---|---|
| 3519806 | 8/1986 | Fed. Rep. of Germany . |
| 4013836 | 10/1991 | Fed. Rep. of Germany . |
| 4100534 | 1/1992 | Fed. Rep. of Germany . |
| 1221349 | 8/1988 | Italy . |
| 85634 | 8/1989 | Italy . |

*Primary Examiner*—Joseph Ruggiero

*Attorney, Agent, or Firm*—McCormick, Paulding & Huber

[57] ABSTRACT

A garment cutting system adapted for use with fabrics having a stripe or plaid design is characterized by computer assisted design matching that allows for either manual or automatic matching both between a garment marker to the fabric layup and between sequenced garment segment patterns. The present system employs data reduction techniques to reduce processing time and includes apparatus for optimizing image stability, focus and illumination.

16 Claims, 8 Drawing Sheets

GARMENT CUTTING SYSTEM HAVING COMPUTER ASSISTED PATTERN ALIGNMENT

CROSS-REFERENCE TO RELATED APPLICATIONS

Some of the subject matter hereof is disclosed and claimed in the commonly owned U.S. patent applications entitled "A Pattern Development System", Ser. No 694,666; "Method For Splitting Market Lines And Related Method For Bite-By-Bite Cutting Of Sheet Material", Ser. No. 694,942, now U.S. Pat. No. 5,214,590, each of which is incorporated herein by reference.

TECHNICAL FIELD

The present invention relates to garment cutting systems in general and more particularly towards garment cutting systems that have computer assisted alignment of fabric designs such as stripes and plaids.

BACKGROUND OF THE INVENTION

Computerized garment cutting systems are well known in the art. Known systems include those offered by the assignee of the present invention, such as Gerber Garment Technology (GGT) models S-91, S-93 and S-95. In general, these known cutting systems utilize a marker generated with a computer to optimize piece pattern density and thereby minimize the waste of fabric. However, fabrics which have a plaid or stripe are troublesome in that the clothing designer can specify an alignment of the pattern in several adjacent pieces. Consequently, the highest density of garment segment or piece patterns in the marker is not necessarily the one which provides proper pattern alignment.

In the past, the computerized cutting systems simply generated a marker having fairly large tolerances between adjacent patterns. The cloth to be cut was provided to a skilled worker who would manually align the several patterns with the geometric fabric design in the cloth and thereafter cut the cloth. As a result, cloth having geometric designs therein, such as stripes or plaids, invariably has resulted in higher garment costs due to the increased waste and the use of slow, skilled labor in the cutting process.

It would be advantageous to have a garment cutting system which could provide computer assisted geometric fabric design alignment between these patterns and the cloth, so that the advantageous computer controlled cutting knives and the like can be used regardless of the geometric fabric designs in the cloth. The present invention is drawn toward such a system.

SUMMARY OF INVENTION

Figure 1:
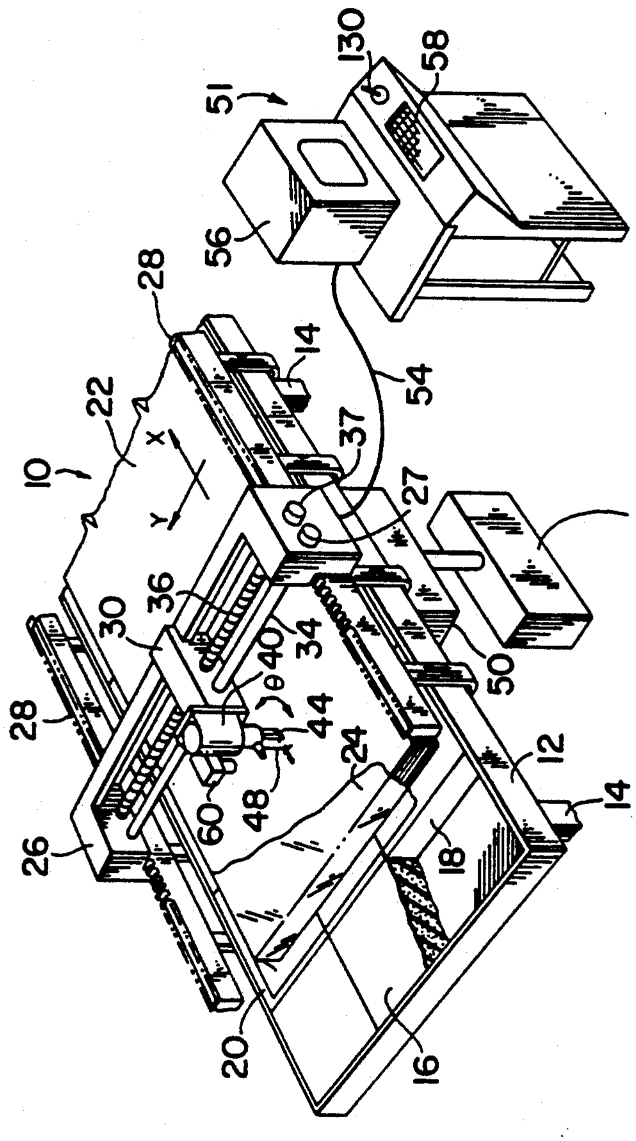
FIG. 1 is a simplified schematic illustration of a cutting system as provided by the present invention.

An object of the present invention is to provide a system for use in cutting sheet fabric having a design therein that provide for alignment of garment segment patterns in a marker with the fabric design location.

According to the present invention, a method for aligning a garment segment pattern at a selected location in a marker with a geometric design in a sheet of fabric on an upper surface of a cutting table in a system having a carriage that is moveable about the table surface in response to command signals; a cutting head having a moveable blade affixed to the carriage, with the blade configured to pierce said fabric sheet in response to blade control signals; a moveable video subsystem configured to receive light from a portion of the fabric sheet in registration with the cutting head and provide electrical signal equivalents thereof, the method includes the steps of receiving marker signals corresponding to the garment segment patterns and a reference signal corresponding to a reference location in the marker to be registered with the fabric design and receiving the video sub-system signals, including signals corresponding to the fabric sheet. The method further includes the steps of generating signals indicative of the fabric design from the fabric sheet signals; measuring a location of the fabric design on the fabric sheet in accordance with image processor signals; comparing the fabric design location with the reference location and generating signals to adjust the garment segment pattern locations in the marker to remove any difference in position between the measured fabric design location and the marker reference location in accordance with the steps of creating a first subarray of pixel signal values configured from the marker signals approximately centered on the reference location; creating a second subarray of pixel signal values from the fabric sheet image array approximately centered on the fabric sheet image array center; determining a first aggregate pixel value error from a sum of pixel value errors found by a comparison between corresponding first and second array values; creating a third subarray of the fabric sheet image array pixel signal values indexed a select amount from said fabric sheet image array center; determining a second aggregate pixel value error from a sum of pixel value errors found by a comparison between corresponding first and third array values and identifying as a match that subarray whose comparison with said first array yielded the lessor of the first and second aggregate pixel value errors.

According to another aspect of the present invention, a system for use in cutting garment segments from a sheet of fabric having a geometric design therein includes a table adapted to receive the fabric sheet on an upper surface thereof. A carriage is provided that is moveable about said table surface in response to command signals. A cutting head has a moveable blade affixed to the carriage, with the blade configured to pierce the fabric sheet in response to blade control signals. A moveable video sub-system is configured to receive light from a portion of the fabric sheet in registration with the cutting head and provide electrical signal equivalents thereof. The present system includes a controller that has a means for generating the carriage command signals to move the carriage to a commanded position above the fabric sheet and for providing the blade command signals to move the blade and pierce the fabric sheet. An apparatus is provided for receiving marker signals corresponding to a marker having a plurality of garment segment patterns configured at selected positions in a plane to be registered with the fabric sheet. The marker signals further include a reference signal that corresponds to a reference location in the marker to be registered with the fabric design. An image processor receives the video sub-system signals, including signals corresponding to said fabric sheet generates signals indicative of the fabric design. The controller generates compensation signals to adjust a garment segment pattern location in the marker to remove any difference in position between a measured fabric design location and the reference location determined in accordance with a method including the steps of: creating a first subarray of pixel signal values configured from the marker signals approximately centered on the reference location; creating a second subarray of pixel signal values from the fabric sheet image array approximately centered on the fabric sheet image array center; determining a first aggregate pixel value error from a sum of pixel value errors found by a comparison between corresponding first and second array values; creating a third subarray of the fabric sheet image array pixel signal values indexed a select amount from said fabric sheet image array center; determining a second aggregate pixel value error from a sum of pixel value errors found by a comparison between corresponding first and third array values and identifying as a match that subarray whose comparison with said first array yielded the lessor of the first and second aggregate pixel value errors.

DESCRIPTION OF THE PREFERRED EMBODIMENT

In the following description, an illustrative embodiment of the present invention is described in connection with the use of apparatus shown and described in U.S. Pat. No. 3,495,492 entitled "Apparatus for Working on Sheet Material" and U.S. Pat. No. 3,548,697 entitled "Apparatus for Cutting Sheet Material", which are assigned to the assignee of the present invention. It will be appreciated that the invention is not limited solely to the use of such apparatus.

Figure 7:
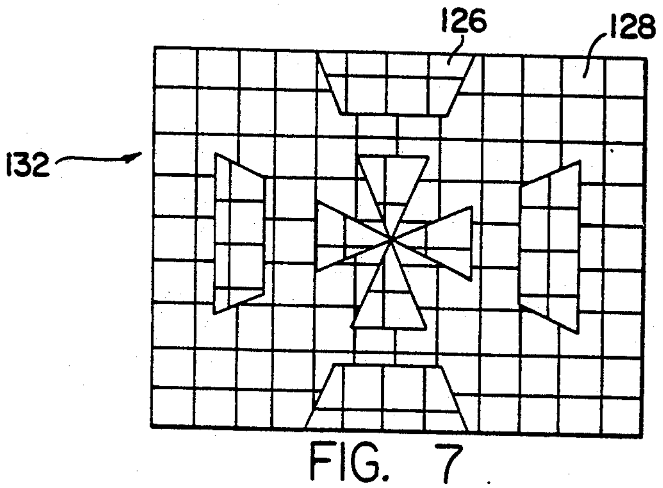
FIG. 7 is a simplified illustration of a display of the type shown in FIG. 6 showing fabric design and pattern misalignment.
Figure 8:
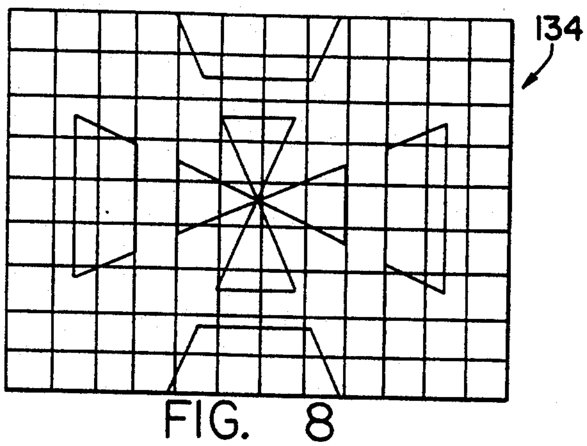
FIG. 8 is a simplified illustration of a display of the type shown in FIG. 6 showing fabric design and pattern alignment.

Referring now to FIG. 1, a sheet material or fabric cutting system, which is referred to generally with the reference character 10, is shown having a table 12 supported on legs 14 therefor. The table 12 is in the form of a container-like frame which carries a plurality of plastic blocks 16, having bristles arranged to form a penetratable bed 18 having a flat upper surface 20 thereon. The substantially continuous planar surface 20 formed by the upper surfaces of the blocks 16 supports a layup or spread 22 of a single or plurality of sheet materials, such as fabric, which are arranged in vertically stacked relation and in position on the surface 20 to be cut. As seen in FIGS. 7 and 8, the sheet fabric has a periodic geometric fabric design 21 woven therein. The layup of sheet material 22 is covered by a sheet of thin plastic film 24, e.g. polyethylene which serves to contain a vacuum which is applied to the layup 22.

A main carriage 26, which transversely spans the table 12, is supported on the table by a pair of elongated racks 28 mounted on opposite sides of the table 12 and extending longitudinally thereof for moving the carriage 26 in a longitudinal or X direction. The main carriage 26 includes a drive shaft (not shown) which also extends transversely of the table and has pinions mounted at opposite ends for engagement with the racks 28 to move the carriage 26 longitudinally across the table in response to the operation of a drive motor 27 drivingly connected to the shaft. The main carriage 26, moveably carries thereon a cutter carriage 30 mounted for movement in the Y direction on a guide bar or tube 34 and a lead screw 36, which also extends transversely of the table 12 and serves to support and drive the cutter carriage 30 transversely across the table, or in the Y direction, in response to the operation of another drive motor 37 drivingly connected with the lead screw 36.

The cutter carriage 30 has a cutter head 40 mounted thereon for vertical movement relative thereto so as to be capable of being raised and lowered to elevate a reciprocating cutting blade 44 and an associated presser plate mounted thereon from a normal cutting position to a position at which they are located entirely not of contact with and above the fabric layup 22. Thus, when the cutter head 40 is raised, the lower extremity of the blade 42 is positioned above the layup 22 so that the head with the blade may, if desired, be moved to any preselected position above the layup, and then lowered to pierce the layup, thus allowing a cut to be started on any desired position in the fabric. The blade 42 is reciprocated vertically by a motor (not shown) in the cutter head 40, and is also rotated about its own vertical axis, referred to as the $\theta$ (theta) axis, as indicated in FIG. 1, by another motor (not shown) in the cutter head 40.

The cutter head 40 also carries a locater or pointer 48. The pointer is pivotally mounted on a pin projecting from the head so that the pointer may be pivoted into the illustrated operative position in front of the cutter blade for precisely positioning the cutter head 40 and blade relative to a desired location or index mark on the layup 22, and is then swung upward and out of the way to a stowage position after the positioning of the cutter head 40 is performed. Forms of pointers other than that shown in FIG. 2 may be utilized to perform the function of accurately positioning the cutter blade 42 over a specific point on the layup 22.

The table 12 is provided with ducts 50 which are connected to a vacuum pump 52. The plastic overlay or film 24 on the spread or layup 22 serves to contain the vacuum applied through the table surface or bed 18 of porous or vertically vented plastic blocks 16, causing the sheet material or fabric in the layup 22 to be compressed into a firm stack that will not shift during cutting. The drawing, for ease of illustration, only shows one table segment and a diagrammatic showing of the vacuum system; but it will be understood that each table segment has a separate vacuum valve which is actuated by the carriage 26 when it is over a particular segment. Vacuum is applied, therefore, only to the area under the carriage to hold the fabric being cut. This allows the cut bundles to be easily removed, and makes the application of the vacuum from a single source practical.

If it is desired to cut more than one layer of fabric having designs thereon, it may also be desirable to provide the cutting table with a system of pins to facilitate spreading fabric with the design of each layer corresponding to the adjacent layer. Such a system is described in U.S. patent application Ser. No. 525,870, filed on May 17, 1990, now U.S. Pat. No. 5,020, entitled "Apparatus With Moveable Pins For Spreading And Cutting Layups Of Sheet Material" and assigned to the same assignee as this application. Alternately, the fabric can be spread with the designs on the various layers corresponding before the fabric layup is placed on the table.

The cutting system 10 includes a controller 52 which sends and receives signals on lines 54 and processes those signals in accordance with algorithms detailed hereinafter. The controller comprises a video display 56 of a known type as well as a conventional address keyboard 58. The controller includes a PC type computer with sufficient computer memory and other peripheral hardware to perform the functions set forth herein. The preferred controller also includes "video frame grabber"/image processing circuitry such as the "AT Vista board" marketed by the TrueVision company.

The present controller preferably comprises two central processor units (CPU) in order to accomplish the functions set forth hereafter. The system CPUs are a main CPU for controller overall system functions and an image processor CPU dedicated to generate and process video signals. The following is a list of signal parameters passed between the main processor in typical system (GGT C100 cutter) and the image processor located in the GGT C100 cutter on the video frame grabber board. Each variable described is a 16 bit word residing in the memory of the image processor. By "frame" it is meant an array of video pixels corresponding to the image seen by the camera at a given time.

I) COMMAND
- a) Main CPU
  - 1) Output—The main CPU issues a command to the image processor by loading this variable with the number of the command to be executed.
  - 2) Input—This variable contains a zero when the image processor is ready to accept to a new command. Otherwise, it contains the number of the last command issued by the computer.
- b) Image Processor
  - 1) Output—The image processor zeroes out the command variable upon completing a command.
  - 2) The image processor executes the command whose value is contained in this variable.

II) STATUS
- a) Main CPU
  - 1) Output—N/A
  - 2) Input—This variable contains a zero unless an error condition occurs on the image processor.
- b) Image Processor
  - 1) Output—This variable is set to a non-zero value upon an image processing error.
  - 2) N/A III) X AND Y
- a) Main CPU
  - 1) Output—X and Y contain the X and Y coordinates for graphic functions such as "DRAW CROSSHAIR".
  - 2) Input—After completion of an automatic match, X and Y contain the coordinates of the located match point.
- b) Image Processor
  - 1) Output—After completion of an automatic match, X and Y contain the coordinates of the located match point.
  - 2) Input—X and Y contain the X and Y coordinates for graphic functions such as "DRAW CROSSHAIR".

IV) X SIZE AND Y SIZE
- a) Main CPU
  - 1) Output—Contains the size in pixels for graphic functions such as "DRAW CROSSHAIR".
  - 2) Input—After completion of an automatic match, Y size contains the match coefficient of the computed match point.
- b) Image Processor
  - 1) Output—After completion of an automatic match, Y size contains the match coefficient of the computed match point.
  - 2) Input—Contains the size in pixels for graphic functions such as "DRAW CROSSHAIR".

V) FRAME 1
- a) Main CPU
  - 1) Output—Selects the storage frame number to which a command is to be applied. In commands requiring a source and a destination storage frame, FRAME 1 acts as the source frame.
  - 2) Input—N/A
- b) Image Processor
  - 1) Output—N/A
  - 2) Input—Selects the storage frame number to which a command is to be applied. In commands requiring a source and a destination storage frame, FRAME 1 acts as the source frame.

VI) FRAME 2
- a) Main CPU
  - 2) Output—Selects the storage frame number to which a command is to be applied. In commands requiring a source and a destination storage frame, FRAME 2 acts as the destination frame.
  - 2) Input—N/A
- b) Image Processor
  - 1) Output—N/A
  - 2) Input—Selects the storage frame number to which a command is to be applied. In commands requiring a source and a destination storage frame, FRAME 2 acts as the destination frame.

Those skilled in the art will note that the above protocol between processors is exemplary and others may be substituted depending on the specific application and hardware.

Figure 2:
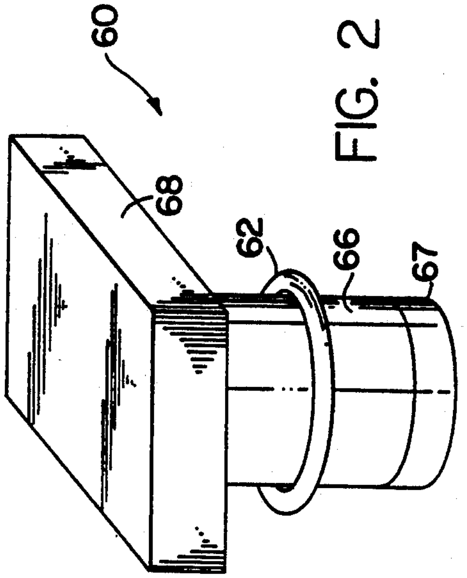
FIG. 2 is a simplified schematic illustration of a video sub-system of the cutting system of FIG. 1.

Further, the cutting system has a video sub-system 60 for generating image signals of a portion of the fabric sheet of interest. The video sub-system is configured with the cutting head to move as an assembly. As seen in FIG. 2, the video sub-system includes an illumination apparatus 62 that comprises a fluorescent ring with a light shroud (not shown), high intensity halogen bulb or illuminated fiber optic bundle. The illumination apparatus preferably encompasses a lens 66 and an adjustable aperture 67 both of which are adjustable in accordance with received command signals. Light reflected from the table is provided via the lens to a charge coupled device (CCD) array color camera or vidicon 68 which generates electrical signal equivalents of the image of the selected fabric portion. The amount of light generated by the illumination apparatus, the focus of the lens and the aperture opening are determined in the present system in accordance with algorithms set forth hereinafter.

Figure 3:
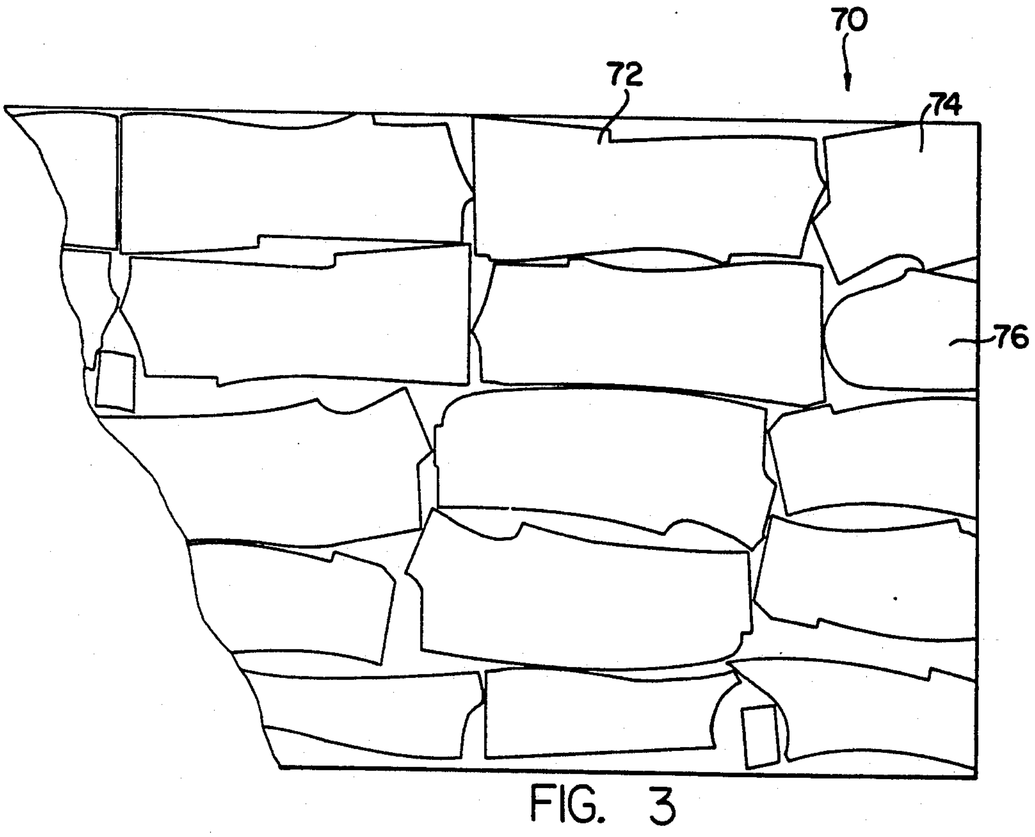
FIG. 3 is a top plan view of a portion of a marker is with prior art cutting systems.

In FIG. 3 there is shown a top plan view of a marker 70 comprised of a plurality of adjacent garment segments or panels 72, 74, 76 configured as close as possible to minimize the waste of fabric. In the preferred embodiment, the marker is a computer generated data file resident in the controller. When the fabric is homogeneous, the marker design shown in FIG. 3 is preferable. As set forth above however, great care must be exercised with a plaid or other fabric having a repeating design to position the pattern so that the garment segments will have the desired alignment when sewn together. Consequently, the marker includes not only information regarding the perimeter of the garment segments but also contains data on the fabric design and the desired relationship of the particular garment segments. This correlating information is in the form of matching and reference points typically located in the interior of the patterns where a particular point in the fabric design is supposed to lie.

Figure 4:
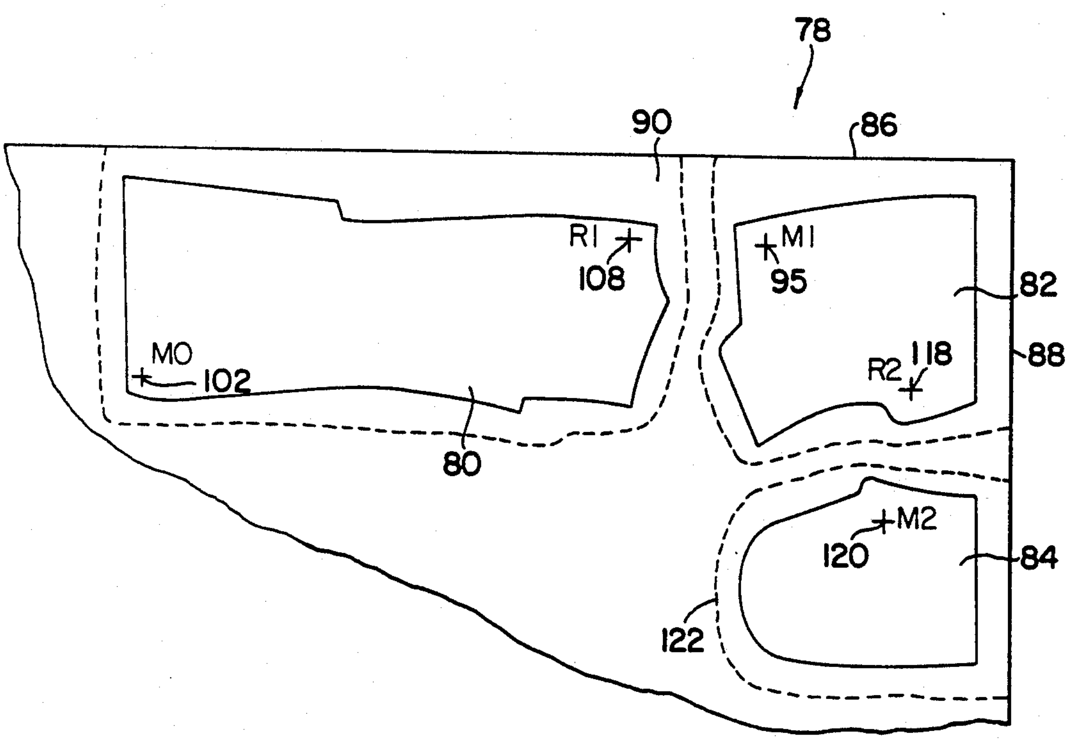
FIG. 4 is a top plan view of a portion of a marker used with the present invention.

The result of the garment fabrication parameters such as imprecise dimensional differences in the design repeat as well as the effects of bowing and skewing caused by poor control during the fabric finishing operations forces the marker maker to leave relatively large buffers around the garment segment patterns that require matching; often as much as half a fabric design repeat. In the present context, "matching" is defined as the alignment of fabric design repeats in the fabric from one segment of a garment to a corresponding segment, i.e. the top sleeve of a man's coat matching the front part thereof at a specified point. The amount of buffer or extra fabric allowance required to bring a garment segment into alignment with its neighbor is a factor derived from the repeat of the fabric design and the quality level of the fabric in use. Enough buffer must be left to allow the system or operator to move the pattern to a different position than the marker maker on the CAD system originally chose. FIG. 4 is a top plan view of a portion of a marker 78 used with plaid fabric. Patterns 80, 82 and 84 are located adjacent one another and edges 86 and 88, Note that the marker also comprises a buffer 90 around each pattern.

Figure 5:
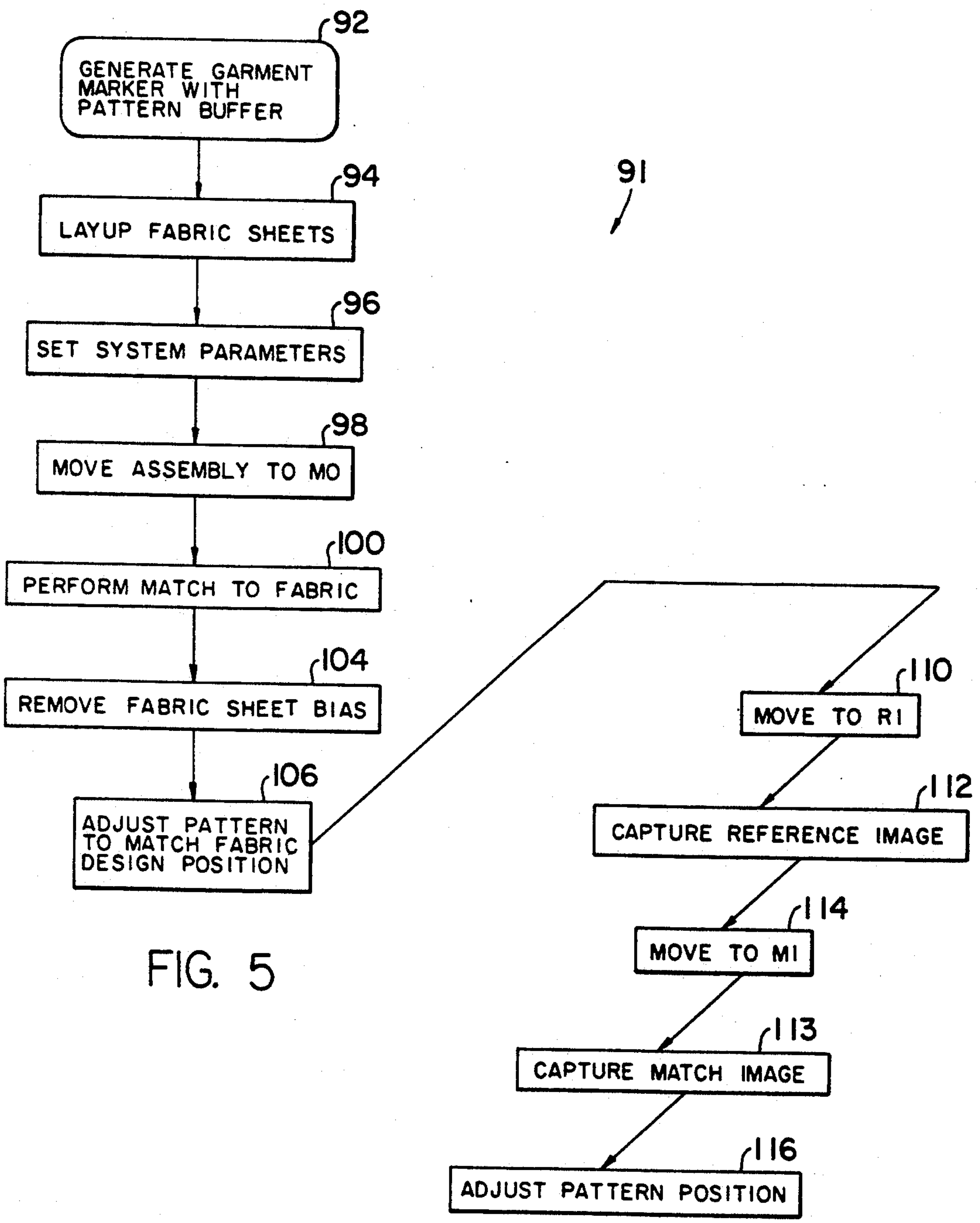
FIG. 5 is a diagrammatic illustration of an algorithm executed by the cutting system of FIG. 1 in matching patterns and fabric designs.

A method provided according to the present invention provides an improved technique of matching by the following algorithm 91 illustrated with respect to FIGS. 4 and 5. Initially at block 92, the marker is configured with the patterns arrayed with respect to the particular fabric design with matching reference points for each pattern as detailed above. This process creates a theoretical, precise relationship between each position in the marker and the fabric sheet(s) registered therewith. After the fabric sheets are positioned on the table with the designs thereon in substantial alignment (block 94), and after the focus, illumination, and other parameters of the system have been set (block 96) as set forth hereinafter, the cutter head and video sub-system assembly are positioned in registration with an origin point on the fabric sheet (block 98). The origin point may be on the perimeter or interior of the marker and sheet, depending on application.

The controller then provides command signals to move at block 100 the cutting head to a first, match-to-fabric point 102 (M0). The operator then manually slews the cutting head to ensure that the theoretical match-to-fabric point is aligned with the fabric design. This operation is the only one in the preferred embodiment which requires manual input. Thereafter, the present system accomplishes the programmed functions without the need for human intervention when configured as an automatic design matching. The system then will note the variation from the ideal location of (M0) and adjust all subsequent pattern position accordingly. It has been determined that the error between the actual and theoretical locations of (M0) are the largest in magnitude and are carried throughout the matching process. The measured variation constitutes a "bias" error. Consequently, the present invention provides for an automatic adjustment of the coordinates of the subsequent patterns (block 104). The system then provides for a pattern match either manually or automatically as detailed hereinafter (block 106).

Typically the match-to-fabric point is located on the primary or "anchor" garment segment (80, FIG. 4). As detailed hereinafter, the subsequent garment segment patterns are arranged in a hierarchical "parent-child" relationship. Each match is accomplished in order. The controller generates signals to move the cutting head and video sub-system assembly to a first reference point 108 (R1) within the anchor pattern (block 110). A reference image is captured by the controller and stored in memory (block 112). The cutter head and video sub-system are moved over the selected garment segment to capture an image (block 113) at a match point 96 (M1) located in the second pattern whose pattern position is dependent on the anchor pattern (block 114). The second pattern is the "child" to the anchor pattern "parent".

The controller commands an image to be taken of this match point. The present invention provides for a subsequent alignment between the first stored image at (R1) and that of (M1) either manually or automatically in accordance with algorithms detailed hereinafter (block 116). The process is repeated for each pattern to be matched to the fabric. The controller moves to a second reference point 118 (R2) located in the "child" pattern. An image of the fabric at this location is stored in memory and the controller moves the cutting head and video sub-system to a third pattern 84 that must be matched to the second at a second match point 120 (M2). The present system performs the same match process as before, either manually or automatically, to adjust the location of the pattern vis-a-vis the fabric sheet. In this way the second pattern becomes the "parent" to the third pattern "child". The process is repeated for all the patterns that require matching. Note that the present system will output an error signal should the adjustment in pattern position move the pattern beyond an outer bound, typically buffer boundary 122.

Figure 6:
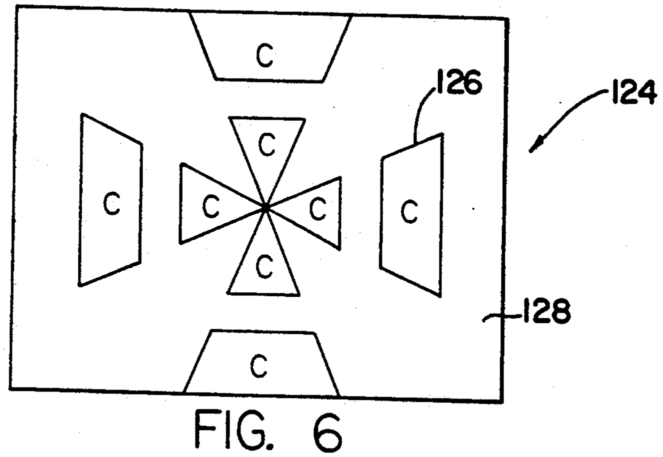
FIG. 6 is a schematic illustration of a display provided by the cutting system of FIG. 1.

As noted above, the present system allows for either manual or automatic alignment of the marker and the fabric sheet at the match points. The manual process can be seen by way of reference to FIGS. 6–8. As noted above, a first reference image is captured and stored as well as displayed on the video display. The controller is configured to display a real time image provided by the video sub-system in most portions of the display. In FIG. 6 there is shown a display 124 provided by the video sub-system. The display 124 is comprised of a captured reference signal in those portions 126 denoted with a "c". The remaining display portion 128 is a real time image.

With the present invention, the operator can move the cutting head, and hence the video sub-system, by means of a motor operated by signals input by a conventional "joystick" multi-axis signal generator (130, FIG. 1). When the fabric sheet and cutting head are misaligned, the controller produces an image similar to the display 132 of FIG. 7. The "overlay" of the captured reference image and the real time image of the fabric with the design enhances any misalignment between captured image portion 126 and real time image portion 128. When the operator has positioned the assembly so that the captured reference and real time match images coincide, the display 134 of FIG. 8 is the result. The image portions seamlessly flow one to another.

Figure 9:
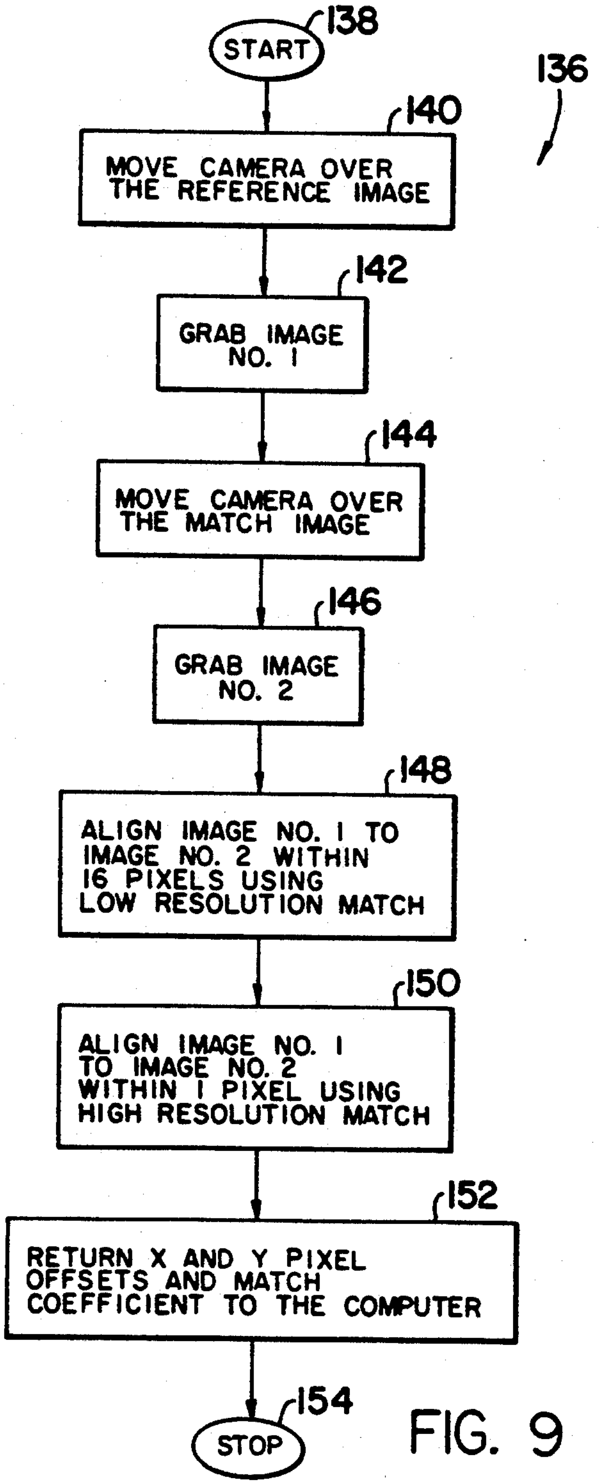
FIG. 9 is a diagrammatic illustration of an algorithm executed by the cutting system of FIG. 1 in automatic matching patterns and fabric designs.

The present invention also automatically performs the design matching with the controller in accordance with the following algorithm 136 diagrammatically shown with respect to FIG. 9. Initially at block 138, both the selected reference and match images are captured and stored (blocks 140–146). A low resolution match is first performed (block 148), followed by a second, high resolution match (block 150). Thereafter, the X and Y pixel offsets and match coefficient are identified and returned to the controller (block 152) before termination of the algorithm (154).

It is preferable to reduce the quantity of information in each image. One method of data reduction is as follows. Each image comprises 504 by 486 "real" pixels, with each pixel or element typically comprised of red, blue and green colors having 8 bits of intensity magnitude for a total of 24 bits of information per pixel. Each image is divided into n by n pixel units or "super pixels", with "n" set to 16 in the preferred embodiment. In this manner the quantity of information is reduced a factor of (n*n). If n=16, the information needed to be processed is reduced by a factor of 256. With the present example, an array of 31 by 30 pixel units or "super pixels" are created.

All pixel signal values in a pixel unit are integrated but still segregated by color. For example, the red, green, and blue components of each pixel unit are individually added to yield a summed value of each color for each pixel unit. The resultant pixel values replace the original (n*n) pixels in low resolution matching calculations. The algorithm next selects central subarrays (typically 14 by 15, although other array geometries can be selected) for each of the reference and match images from the larger 31 by 30 pixel unit array. For both the central reference and match subarrays, the controller compares each reference subarray element with its corresponding match subarray element to look for a difference in signal magnitude. As differences are detected by the controller, they are summed, with the aggregate or image error and kept for future reference. In sum:

R=Difference between Red component of reference pixel and Red component of match pixel.

G=Difference between Green component of reference pixel and Green component of match pixel.

B=Difference between Blue component of reference pixel and Blue component of match pixel.

Pixel Error=R+G+B

The center, match subarray is mathematically "slid" in a spiral pattern away from the center, reference subarray. That is; another match subarray of the same dimension is formed displaced from the central one. The selection of subsequent subarrays is accomplished in a variety of ways which include incrementing the subarray element start position by n, where n=1,2,3 . . . In the present example, the second match subarray would begin with the 15th row and 16th element. Here again an aggregate error value is computed by the above comparison technique and either stored for future evaluation or compared directly with the aggregate error value from the preceding comparison, with the smaller value being kept. If, in the process of calculating to aggregate subarray error value, the value exceeds the best error value so far, the summation for the subarray is aborted, thus avoiding needless calculations. Ultimately the controller determines which match subarray yields the smallest overall aggregate error and identifies that match subarray as the closest fit. Note that the present system includes protection from computationally induced malfunctions and will generate an error signal should the aggregate error value exceed a threshold value. Also, it has been empirically determined that a subarray will be determined to match the central reference subarray within 196 subsequent match subarrays. Thus, the low resolution match (148, FIG. 9) is accomplished.

In a manner similar to the method detailed above, a high resolution match (150, FIG. 9) is then performed. The low resolution match provides a starting point very close (+or −n pixels) of the actual match point. The high resolution match identifies which subarray contains the match point. As above, it is initially assumed that the match point is contained in the center of the match image. Small central subarrays (for example, 50 by 50 pixels) of both the high resolution match and reference images are selected. Here the controller is utilizing the full pixel data unless it has been reduced by another method such as described hereinafter. The two central subarrays are compared pixel by pixel (or in the preferred method, every other pixel is compared) to obtain an aggregate or image error which, as above, is used to select the high resolution pixel match. An example of a pixel error value for each pixel follows:

R=Difference between Red component of reference pixel and Red component of match pixel.

G=Difference between Green component of reference pixel and Green component of match pixel.

B=Difference between Blue component of reference pixel and Blue component of match pixel.

Pixel Error=R+G+B

The match subarray is, as before, mathematically slid in a spiral pattern away from the center of the high resolution reference image. This "sliding" computation is limited to n (where n is the number of rows and columns in a pixel unit) pixels to the right, to left, above, and below the low resolution match point. With the present example the sliding computation is limited to 1024 separate calculations.

Figure 10:
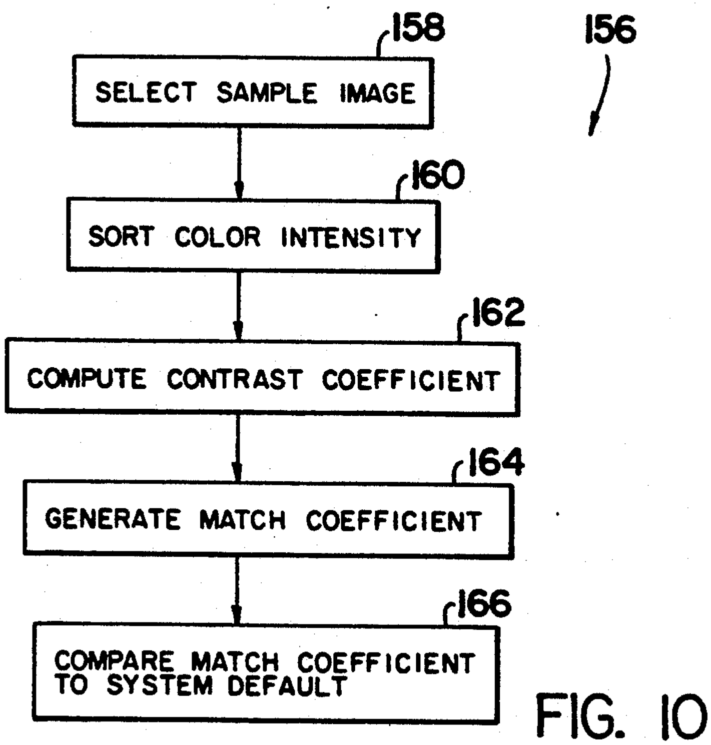
FIG. 10 is a diagrammatic illustration of an algorithm executed by the cutting system of FIG. 1 in computing a match coefficient.

A match confidence coefficient is calculated by the controller after the match has been found. As shown in FIG. 10 an algorithm 156 provides that a small region (for example, 50 by 50 pixels) around the match point of a reference image be first selected (block 158). The red, green, and blue components of each pixel in this region are sorted by intensity (block 160) and a contrast coefficient is determined to be the difference between the brightest and darkest pixel (block 162). An average error value of a scaled low resolution error and the high resolution error is divided by the contrast coefficient to return a match confidence coefficient (block 164). The match coefficient corresponds to the degree of mismatch; a match coefficient of zero indicates a perfect match. The match coefficient is compared to a system default, or a user selectable value (block 166). Any coefficient less than or equal to the defined value is considered acceptable.

Figure 11:
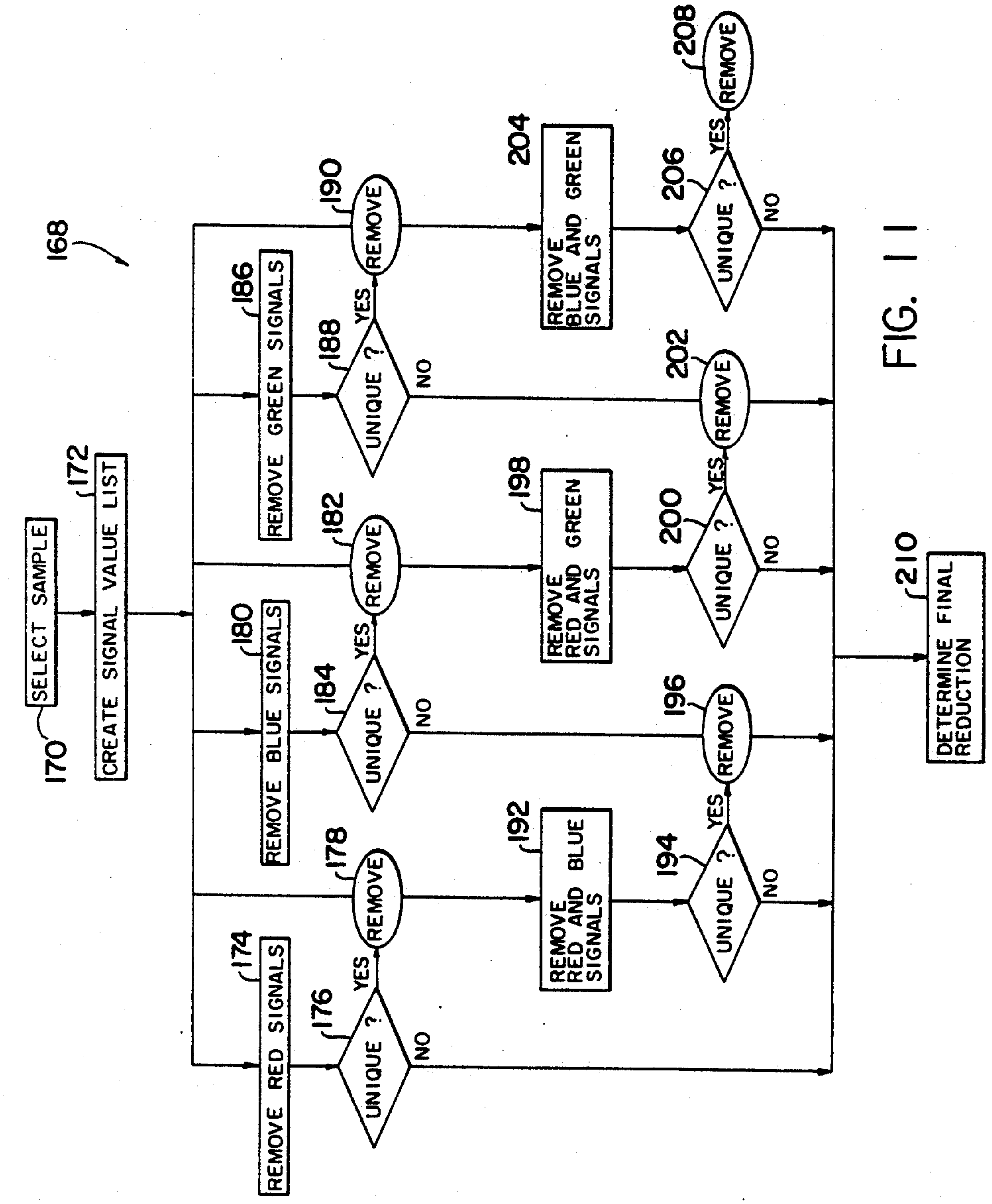
FIG. 11 is a diagrammatic illustration of an algorithm executed by the cutting system of FIG. 1 in data reduction.
Figure 14:
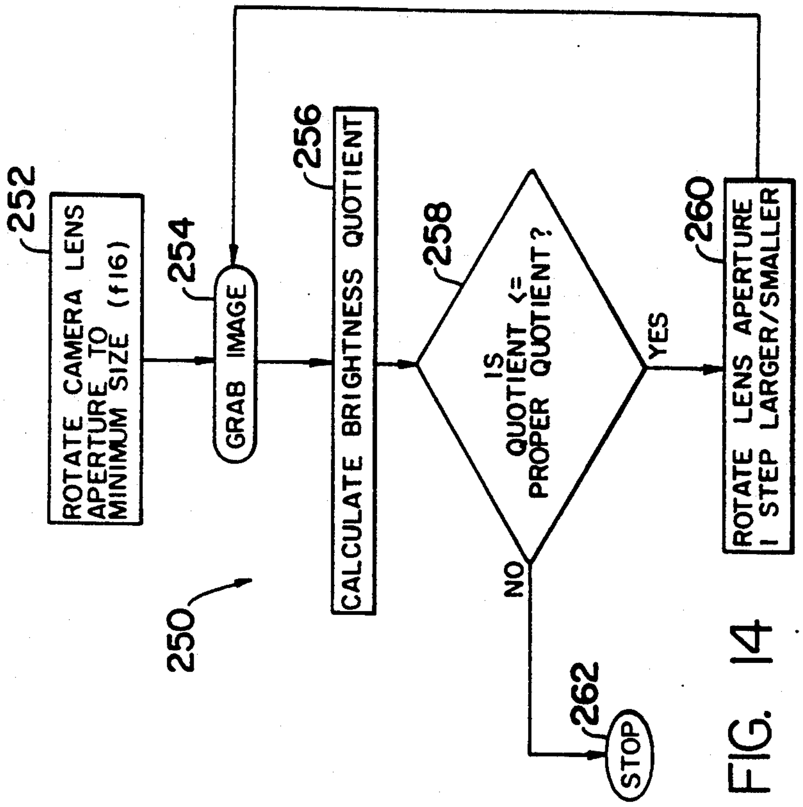
FIG. 14 is a diagrammatic illustration of an algorithm executed by the cutting system of FIG. 1 in adjusting fabric illumination.

Most fabrics have designs that do not require that the entire 24 bits of image information be used in order to achieve an accurate alignment. By minimizing the number of image bits that are processed, the time required for processing can be reduced. The following describes an algorithm 168 for data minimization used with the present invention. This process can be done as part of the initial match-to-fabric step 100 of FIG. 5. As seen with respect to FIG. 11, prior to performing any image alignments on a given fabric, a sample image must be captured (block 170), and a list of every signal value for each pixel color in the sample image is created (block 172). The sample can be of arbitrary size, but is preferably 460 by 440 pixels. Each entry in the list is unique at this point. The following data removal and comparison steps are taken.

1) The red element of each list entry is temporarily removed (block 174). If all entries in the resulting list are still unique (block 176), the 8 bits of red information may be ignored without affecting image alignment (block 178).
2) The blue element of each list entry is temporarily removed (block 180). If all entries in the resulting list are still unique (block 182), the 8 bits of blue information may be ignored without affecting image alignment (block 184).
3) The green element of each list entry is temporarily removed (block 186). If all entries in the resulting list are still unique (block 188), the 8 bits of green information may be ignored without affecting image alignment (block 190).
4) The red and blue elements of each list entry are temporarily removed (block 192). If all entries in the resulting list are still unique (block 194), the 16 bits of red and blue information may be ignored without affecting image alignment (block 196).
5) The red and green elements of each list entry are temporarily removed (block 198). If all entries in the resulting list are still unique (block 200), the 16 bits of red and green information may be ignored without affecting image alignment (block 202).
6) The blue and green elements of each list entry are temporarily removed (block 204). If all entries in the resulting list are still unique (block 206), the 16 bits of blue and green information may be ignored without affecting image alignment (block 208). The image signals later used during processing can be reduced in accordance with the above measurement (block 210).

The following example illustrates data minimization on a simple image containing four colors. Each digit of color represents an 8 bit color element having an intensity magnitude between 0 and 8.

| | RGB | RGB | RGB | RGB | Unique | % Data Reduct. |
|---|---|---|---|---|---|---|
| Remove Nothing | 100 | 401 | 502 | 303 | Yes | 0 |
| Remove Red | 00 | 01 | 02 | 03 | Yes | 33 |
| Remove Green | 1 0 | 4 1 | 5 2 | 3 3 | Yes | 33 |
| Remove Blue | 10 | 40 | 50 | 30 | Yes | 33 |
| Remove Red & Green | 0 | 1 | 2 | 3 | Yes | 66 |
| Remove Red & Blue | 0 | 0 | 0 | 0 | No | — |
| Remove Green & Blue | 1 | 4 | 5 | 3 | Yes | 66 |

In the above table, two solutions result in a data reduction of 66 percent. The choice between the two solutions is arbitrary. If data reduction is to be employed, the above reduction step would typically be accomplished prior to any matching between reference and match images.

Because the camera is mechanically mounted to move with the cutting head, it will vibrate for a period of time after the video sub-system stops moving. This period varies from a fraction of a second to several seconds, depending on velocity. Images captured during camera vibration are not suitable for precise matching. Therefore, the system must wait until the vibration or motion has stopped before capturing images. The present invention minimizes the delay waiting for the camera to stabilize by sensing when this motion has stopped. Each time the camera is moved to capture a new image.

Figure 12:
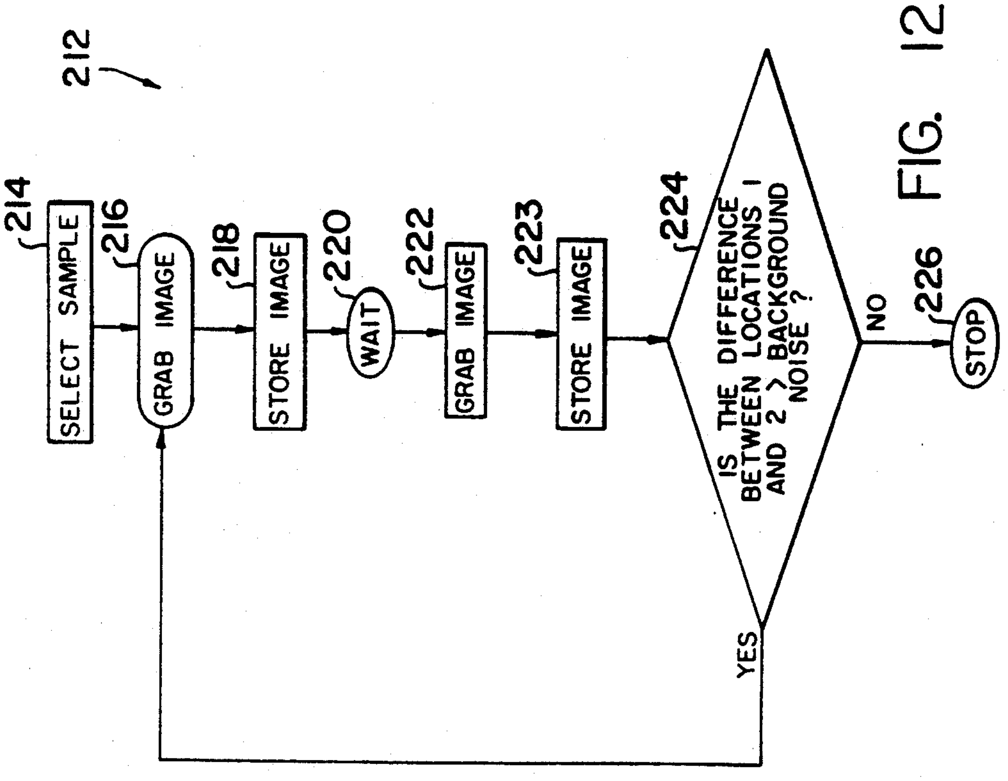
FIG. 12 is a diagrammatic illustration of an algorithm executed by the cutting system of FIG. 1 in eliminating vibration induced signal noise.

As seen by way of reference to FIG. 12, an algorithm 212 of motion sensing as provided by the present invention initially comprises the steps of selecting a sample image (block 214), capturing (block 216) and storing (block 218) a sample image (e.g. 128 by 121 pixels), waiting a short period of time (block 220), capturing (block 222) and storing (block 223) a second image and comparing the two images (block 224). An image error value is calculated by summing the differences between corresponding pixels of the two images. If the value exceeds that which could be attributed to environmental noise (electrical noise or small vibrations which continue long after the image cutter head stops moving), the image is unstable, and motion sensing continues. Otherwise, the image is stable, motion detection stops (block 226), and the last captured image is accepted for processing. If the process exceeds 5 seconds, the system generates an error signal and halts further processing.

Figure 13:
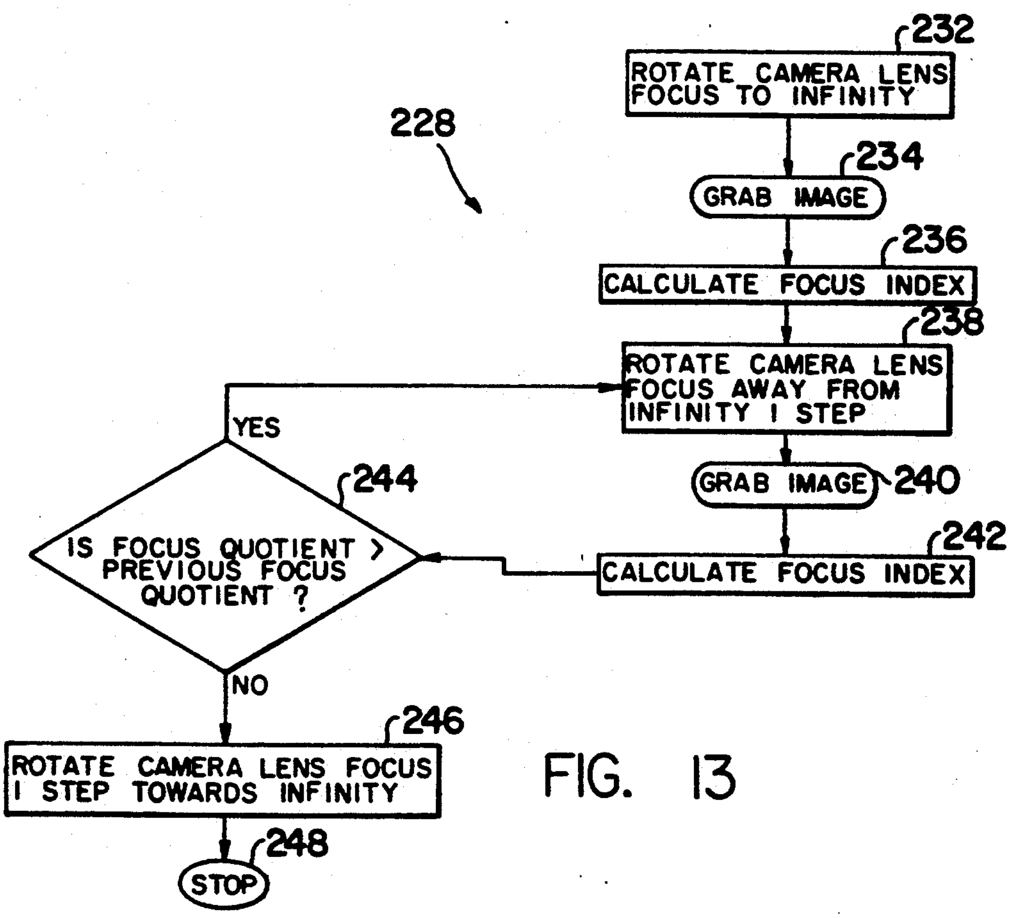
FIG. 13 is a diagrammatic illustration of an algorithm executed by the cutting system of FIG. 1 in adjusting camera focus.

Improper camera focusing will also adversely effect the quality of automatic focusing to assure the best possible plaid alignment, by sensing image focus in an objective manner. An algorithm 228 set forth in FIG. 13 is executed by the present system as follows:

1) Automatically or manually, turn camera lens focus ring are the way to infinity setting (block 232).
2) Capture an image (block 234)
3) Calculate a focus index.

a) Calculate focus index pixel brightness (block 236) determined from the sum of the differences in signal magnitudes between adjacent pixels in the same image. The greater the difference, the better the focus.

b) Return the focus index to the user as a numeric or graphic display.

4) Slowly turn the focus ring away from infinity (block 238). Resample the image (block 240). Recompute the focus index. Compare (block 242) the current and past values of the focus index (block 244). The focus index will steadily increase until the image becomes sharply focused (highest focus index). At some point, turning the focus ring to the left will begin to reduce the focus index (block 246).

5) The focus ring is set to the position which return the highest focus index (block 248).

Improper image brightness will adversely affect the quality of automatic plaid alignment. The present system provides computer assisted brightness control to assure the best possible fabric design alignment by detecting image brightness in an objective manner. The following steps are executed by an algorithm 250 provided by the present invention to adjust the light intensity:

1) Set aperture to minimum opening (block 252)

2) Capture a sample image (e.g. 128 by 121 pixels) (block 254).

3) Calculate (block 256) the average pixel brightness or brightness quotient "C" as follows:

a) A=the sum of the red, green, and blue signal components of all pixels.

b) B=A/(3*number of pixels). C=(maximum-color-value+1)/2

4) Compare C with preselected value (block 258). Adjust aperture (block 260). While B<C, slowly automatically or manually open the lens aperture and repeat steps 2, 3. While B>C, slowly close the lens aperture and repeat steps 2, 3.

5) If B=C, or B is very close to C, the image brightness is correct (block 262). The system is configured to accept an image brightness variation of = or −5%. For example, if each color component consists of 8 bits, maximum-color-value=255, and C=(255+1)/2=128.

Similarly, although the invention has been shown and described with respect to a preferred embodiment thereof, it should be understood by those skilled in the art that various other changes, omissions and additions thereto may be made therein without departing from the spirit and scope of the present invention. For example, those skilled in the art will note that the present controller can be configured as a stand alone unit or can be readily added to known cutting apparatus such as the S-91, S-93 and S-95 GERBERcutter devices.

We claim:

1. A system for use in cutting garment segments from a sheet of fabric, said fabric having a geometric design therein, said system comprising:

a table adapted to receive said fabric sheet on an upper surface thereof;

a carriage moveable about said table surface in response to command signals;

a cutting head having a moveable blade affixed to said carriage, said blade configured to pierce said fabric sheet in response to blade control signals;

a video sub-system moveable about said table surface in response to position signals configured to receive light from a portion of said fabric sheet in registration with said cutting head forming a fabric sheet image and provide electrical signal equivalents thereof; and a controller including:

a means for generating said carriage command signals to move said carriage to a commanded position above said fabric sheet and for providing said blade command signals to operate said blade and pierce said fabric sheet and for generating said video sub-system position signals, a means for receiving marker signals corresponding to a marker having a plurality of garment segment patterns configured at selected positions in a plane to be registered with said fabric sheet, said marker signals further including a reference signal corresponding to a reference location in said marker to be registered with said fabric design, an image processing means for receiving said video sub-system signals including signals corresponding to said fabric sheet and for generating therefrom an array of pixel signal values indicative of said fabric sheet image;

said controller for generating compensation signals to adjust a garment segment pattern location in said marker to remove any difference in position between a measured fabric design location and said reference location determined in accordance with a method including the steps of:

moving said video sub-system in dependence on said marker signals to approximately center said fabric sheet image over said reference location;

creating a first subarray of pixel signal values configured from said marker signals approximately centered on said reference location;

creating a second subarray of pixel signal values from said fabric sheet image array approximately centered on said fabric sheet image array center;

determining a first aggregate pixel value error from a sum of pixel value errors found by a comparison between corresponding first and second array values;

creating a third subarray of said fabric sheet image array pixel signal values indexed from said fabric sheet image array center a select amount;

determining a second aggregate pixel value error from a sum of pixel value errors found by a comparison between corresponding first and third array values;

identifying as a match that subarray whose comparison with said first array yielded the lessor of said first and second aggregate pixel value errors.

2. A system for use in cutting garment segments from a sheet of fabric, said fabric having first and second geometric designs therein, comprising:

a table adapted to receive said fabric sheet on an upper surface thereof;

a carriage moveable about said table surface in response to command signals;

a cutting head having a moveable blade affixed to said carriage, said blade configured to pierce said fabric sheet in response to blade control signals;

a video sub-system affixed to said carriage configured to receive light from a portion of said fabric sheet in registration with said cutting head forming a fabric sheet image and provide electrical signal equivalents thereof; and a controller including:

a means for generating said carriage command signals to move said carriage to a commanded position above said fabric sheet and for providing said blade command signals to operate said blade and pierce said fabric sheet, a means for receiving marker signals corresponding to a marker having a plurality of garment segment patterns configured at selected positions in a plane to be registered with said fabric sheet, said marker signals further including a reference signal corresponding to a reference location in a first pattern to be registered with said first fabric design and a match location in a second pattern said marker to be registered with said second fabric design; and an image processing means for receiving said video sub-system signals including signals corresponding to said fabric sheet and for generating therefrom an array of pixel signal values indicative of said fabric sheet image;

said controller for generating compensation signals to adjust said second garment segment pattern location in said marker to remove any difference in position between a measured first fabric design location and a measured second fabric design location, with a method comprising the steps of;

moving said video sub-system to a first pattern reference point that corresponds to the location on said fabric sheet of said first fabric design, generating signals corresponding to a fabric sheet image at said first pattern reference point, moving said video sub-system to an associated match point in a second pattern that corresponds to the location on said fabric sheet of said second fabric design, generating signals corresponding to a fabric sheet image at said second pattern match point, and adjusting said second pattern location in said marker to remove any difference between the location of said second fabric sheet design and said second pattern match point in accordance with a method comprising the steps of:

creating a first subarray of pixel signal values configured from said first fabric sheet image array approximately centered on said reference point;

creating a second subarray of pixel signal values from said second fabric sheet image array approximately centered on said second fabric sheet image array center;

determining a first aggregate pixel value error from a sum of pixel value errors found by a comparison between corresponding first and second array values;

creating a third subarray of said second fabric sheet image array pixel signal values indexed a select amount from said fabric sheet image array center;

determining a second aggregate pixel value error from a sum of pixel value errors found by a comparison between corresponding first and third array values;

identifying as a match that subarray whose comparison with said first array yielded the lessor of said first and second aggregate pixel value errors.

3. The system of claim 2 further comprising a video display and slewing means for manually inputting said video sub-system position signals and wherein said controller presents a simultaneous video display comprised of portions of said first pattern reference point image and said second pattern match image while said video sub-system is generating said second pattern match image, thereby allowing for manual adjustment of said second pattern position in said marker to remove any difference between the location of said second fabric sheet design and said second pattern match point.

4. The system of claim 3 wherein said controller configures said simultaneous video display with said first pattern reference point image portion alternating with said second pattern match image in a radial manner about a video display center.

5. A method for automatically generating compensation signals to adjust a second garment segment pattern location in a marker to remove any difference in position between a measured reference fabric design location of a first garment segment pattern and a measured match fabric design location, said fabric designs in a fabric sheet on an upper surface of a cutting table in a system having a moveable video sub-system configured to receive light from a portion of said fabric sheet in registration therewith and provide electrical signal equivalents thereof; said method comprising the steps of:

moving said video sub-system to a first pattern reference point in registration with the location on said fabric sheet of said first fabric design, generating a first array of signals corresponding to a fabric sheet image at said first pattern reference point, moving said video sub-system to an associated match point in a second pattern that corresponds to the location on said fabric sheet of said second fabric design, generating a second array of signals corresponding to a fabric sheet image at said second pattern match point;

creating a first subarray of pixel signal values configured from said first fabric sheet image array approximately centered on said reference point;

creating a second subarray of pixel signal values from said second fabric sheet image array approximately centered on said second fabric sheet image array center;

determining a first aggregate pixel value error from a sum of pixel value errors found by a comparison between corresponding first and second array values; creating a third subarray of said second fabric sheet image array pixel signal values indexed a select amount from said fabric sheet image array center;

determining a second aggregate pixel value error from a sum of pixel value errors found by a comparison between corresponding first and third array values;

identifying as a match that subarray whose comparison with said first array yielded the lessor of said first and second aggregate pixel value errors; and adjusting said second pattern location in said marker to remove any difference between the location of said second fabric sheet design and said second pattern match point in dependence on said identified match.

6. A method for automatically generating compensation signals to adjust a second garment segment pattern location in a marker to remove any difference in position between a measured reference fabric design location of a first garment segment pattern and a measured match fabric design location, said fabric designs in a fabric sheet on an upper surface of a cutting table in a system having a moveable video sub-system configured to receive light from a portion of said fabric sheet in registration therewith and provide electrical signal equivalents thereof; said method comprising the steps of:

moving said video sub-system to a first pattern reference point in registration with the location on said fabric sheet of said first fabric design, generating a first database of signals corresponding to a fabric sheet image at said first pattern reference point, moving said video sub-system to an associated match point in a second pattern that corresponds to the location on said fabric sheet of said second fabric design, generating a second database of signals corresponding to a fabric sheet image at said second pattern match point;

performing a low resolution match by:

creating initial first and second subdatabases of pixel signal values configured from said first and second fabric sheet image databases approximately centered on said reference and-match points;

dividing said initial databases into subarrays with each subarray configured relative to the other subarrays to maintain corresponding positions in the respective images; and summing, for each of said subarrays in each of said images, said pixel signal magnitudes to generate a matrix of resultant pixel magnitude signals for each of said images; and creating a final reduced database by replacing the elements of said subarrays with a corresponding element of said corresponding matrix;

determining a first aggregate matrix pixel value error from a sum of pixel value errors found by a comparison between corresponding first and second matrix values;

creating a third matrix of said second fabric sheet image final reduced database indexed a select amount from said fabric sheet image array center;

determining a second aggregate matrix pixel value error from a sum of pixel value errors found by a comparison between corresponding first and third reduced database values;

identifying as a low resolution match that subarray whose comparison yielded the lessor of said first and second aggregate matrix pixel value errors;

performing a high resolution match with said low resolution match subarray elements by:

creating a first subarray of pixel signal values configured from said first fabric sheet image array approximately centered on said reference point;

creating a second subarray of pixel signal values from said second fabric sheet image array approximately centered on said second low resolution match subarray;

determining a first aggregate pixel value error from a sum of pixel value errors found by a comparison between corresponding first and second array values;

creating a third subarray of said second fabric sheet image array pixel signal values indexed a select amount from said fabric sheet image array center;

determining a second aggregate pixel value error from a sum of pixel value errors found by a comparison between corresponding first and third array values;

identifying as a match that pixel value Subarray whose comparison with said first pixel value array yielded the lessor of said first and second aggregate pixel value errors; and adjusting said second pattern location in said marker to remove any difference between the location of said second fabric sheet design and said second pattern match point in dependence on said low resolution and high resolution match.

7. The method of claim 6 wherein said first and second garment patterns are encompassed in said marker within a respective buffer and wherein said method further comprises the steps of generating error signals should said pixel value subarray identified as a match move said second garment segment pattern beyond an outer boundary of said buffer.

8. The method of claim 5 wherein said first and second garment patterns are encompassed in said marker within a respective buffer and wherein said method further comprises the steps of generating error signals should said pixel value subarray identified as a match move said second garment segment pattern beyond an outer boundary of said buffer.

9. The system of claim 2 wherein said first and second garment patterns are encompassed in said marker within respective buffers and wherein said controller further comprises a means for generating error signals should said pixel value subarray identified as a match move said second garment segment pattern beyond an outer boundary of said buffer.

10. The system of claim 1 wherein said garment pattern is encompassed in said marker within a buffer and wherein said controller further comprises a means for generating error signals should said pixel value subarray identified as a match move said garment segment pattern beyond an outer boundary of said buffer.

11. The system of claim 1 wherein said controller further comprises a means for generating, after identifying said measured match subarray, signals to adjust the relative position of each of said garment segment patterns in said marker by the same amount determined by said controller that removed any difference in position between said measured fabric design location and said reference location, thereby removing any positional bias between said marker and said fabric sheet.

12. A system for cutting garment pieces from a sheet of fabric material having a patterned design comprising:

a table having a support surface for receiving a sheet of fabric material from which garment pieces are to be cut;

a cutting head disposed for movement parallel to the support surface of the table and having a cutting blade to cut the sheet of fabric material on the support surface;

a video sub-system also disposed for movement parallel to the support surface of the cutting table and including a video camera of the cutting table and including a video camera for viewing a limited portion of the sheet of fabric material on the surface and forming an image of the patterned design on the limited portion of the material;

controlled carriage means for moving the cutting head and the support surface of the table relative to one another and for moving the video camera and the support surface relative to one another;

marker generating means for producing a marker defining a plurality of garment pieces distributed at selected positions in an array as the pattern pieces would be cut from a sheet of fabric material on the support surface of the table, said marker further having a reference point at which the positional relationship of the marker and the patterned design of the sheet of fabric material can be established;

image processing means connected with the video sub-system for receiving from the camera video signals defining the image of the patterned design viewed by the camera and for generating therefrom a matrix of signal values defining the patterned design in the video image;

means connected to the controlled carriage means for positioning the video camera over the fabric material to obtain a second matrix of signal values defining the patterned design image at a first match point location within the marker of garment pieces;

means for determining a first aggregate matrix value error from the sum of the matrix value errors found by a comparison of the matrix signal values at the reference location and the first match point location;

means connected to the controlled carriage means for positioning the video camera over the fabric material to obtain a third matrix of signal values at second match point location indexed by a selected amount from the first match point location;

means for determining a second aggregate matrix value error from the sum of the matrix value errors found by a comparison of the matrix signal values at the reference location and the second match point location point; and means for identifying as a correct match point location the match point location having the matrix producing the lesser of the first and second aggregate matrix value errors.

13. A system for cutting garment pieces from a sheet of fabric material as defined in claim 12 wherein:

the controlled carriage means includes a first controlled carriage supporting the cutting head and a second controlled carriage supporting the video camera.

14. A system for cutting garment pieces from a sheet of fabric material as defined in claim 12 wherein:

the controlled carriage means includes a controlled carriage supporting both the cutting head and the video camera.

15. A fabric article made in accordance with a method for automatically generating compensation signals to adjust a second garment segment pattern location in a marker to remove any difference in position between a measured reference fabric design location of a first garment segment pattern and a measured match fabric design location, said fabric designs in a fabric sheet on an upper surface of a cutting table in a system having a moveable video sub-system configured to receive light from a portion of said fabric sheet in registration therewith and provide electrical signal equivalents thereof; said method comprising the steps of:

moving said video sub-system to a first pattern reference point in registration with the location on said fabric sheet of said first fabric design, generating a first array of signals corresponding to a fabric sheet image at said first pattern reference point, moving said video sub-system to an associated match point in a second pattern that corresponds to the location on said fabric sheet of said second fabric design, generating a second array of signals corresponding to a fabric sheet image at said second pattern match point, creating a first subarray of pixel signal values configured from said first fabric sheet image array approximately centered on said reference point;

creating a second subarray of pixel signal values from said second fabric sheet image array approximately centered on said second fabric sheet image array center;

determining a first aggregate pixel value error from a sum of pixel value errors found by a comparison between corresponding first and second array values;

creating a third subarray of said second fabric sheet image array pixel signal values indexed a select amount from said fabric sheet image array center;

determining a second aggregate pixel value error from a sum of pixel value errors found by a comparison between corresponding first and third array values;

identifying as a match that subarray whose comparison with said first array yielded the lessor of said first and second aggregate pixel value error and adjusting said second pattern location in said marker to remove any difference between the location of said second fabric sheet design and said second pattern match point in dependence on said identified match.

16. A fabric article made in accordance with a method for automatically generating compensation signals to adjust a second garment segment pattern location in a marker to remove any difference in position between a measured reference fabric design location of a first garment segment pattern and a measured match fabric design location, said fabric designs in a fabric sheet on an upper surface of a cutting table in a system having a moveable video sub-system configured to receive light from a portion of said fabric sheet in registration therewith and provide electrical signal equivalents thereof; said method comprising the steps of:

moving said video sub-system to a first pattern reference point in registration with the location on said fabric sheet of said first fabric design, generating a first database of signals corresponding to a fabric sheet image at said first pattern reference point, moving said video sub-system to an associated match point in a second pattern that corresponds to the location on said fabric sheet of said second fabric design, generating a second database of signals corresponding to a fabric sheet image at said second pattern match point;

performing a low resolution match by:

creating initial first and second subdatabases of pixel signal values configured from said first and second fabric sheet image databases approximately centered on said reference and match points;

dividing said initial databases into subarrays with each subarray configured relative to the other subarrays to maintain corresponding positions in the respective images; and summing, for each of said subarrays in each of said images, said pixel signal magnitudes to generate a matrix of resultant pixel magnitude signals for each of said images; and creating a final reduced database by replacing the elements of said subarrays with a corresponding element of said corresponding matrix;

determining a first aggregate matrix pixel value error from a sum of pixel value errors found by a comparison between corresponding first and second matrix values;

creating a third matrix of said second fabric sheet image final reduced database indexed a select amount from said fabric sheet image array center;

determining a second aggregate matrix pixel value error from a sum of pixel value errors found by a comparison between corresponding first and third reduced database values;

identifying as a low resolution match that subarray whose comparison yielded the lessor of said first and second aggregate matrix pixel value errors;

performing a high resolution match with said low resolution match subarray elements by:

creating a first subarray of pixel signal values configured from said first fabric sheet image array approximately centered on said reference point;

creating a second subarray of pixel signal values from said second fabric sheet image array approximately centered on said second low resolution match subarray;

determining a first aggregate pixel value error from a sum of pixel value errors found by a comparison between corresponding first and second array values; Creating a third subarray of said second fabric sheet image array pixel signal values indexed a select amount from said fabric sheet image array center;

determining a second aggregate pixel value error from a sum of pixel value errors found by a comparison bed, vein corresponding first and third array values;

identifying as a match that pixel value subarray whose comparison with said first pixel value array yielded the lessor of said first and second aggregate pixel value errors and adjusting said second pattern location in said marker to remove any difference between the location of said second fabric sheet design and said second pattern match point in dependence on said low resolution and high resolution match.

* * * * *